Figure 1:
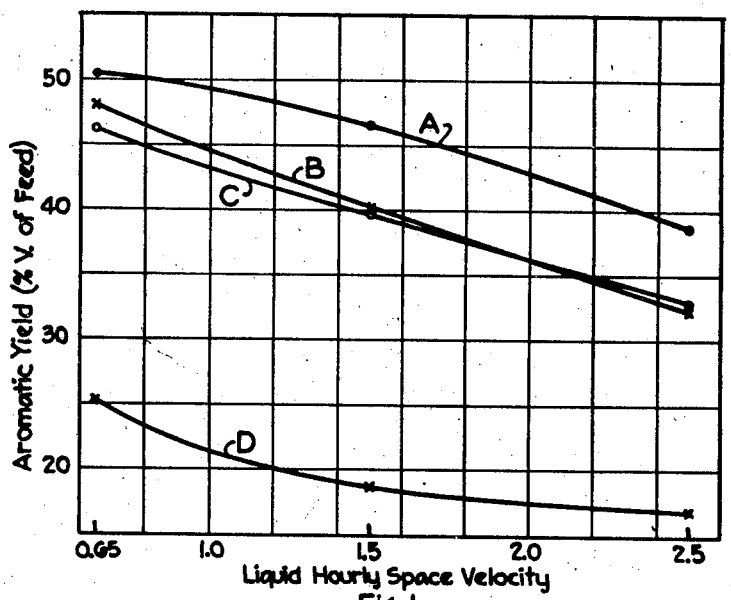

Inventors: Miroslav W. Tamele
Vanan C. Irvine
James F. Mahar
By their Attorney

Patented Nov. 23, 1948

2,454,724

UNITED STATES PATENT OFFICE 2,454,724

MOLYBDENA CATALYSTS, THEIR PREPARATION AND USE

Miroslav W. Tamele, Oakland, Vanan C. Irvine, Richmond, and James F. Mahar, Berkeley, Calif., assignors to Shell Development Company, San Francisco, Calif., a corporation of Delaware Application February 15, 1943, Serial No. 476,032

3 Claims. (Cl. 252—465)

This invention relates to improved molybdena catalysts, to their preparation, and to their use. More particularly, the invention relates to the preparation and use of improved molybdena-alumina catalysts having increased activity, increased stability against loss of activity by use and heat, and increased stability against loss of mechanical strength by use and heat.

As is known, a great many metals and compounds thereof are recognized to catalyze reactions involving the C—H bond. For many processes, and in particular those involving dehydrogenation, a large number of these catalytic agents may therefore be employed. One of the best and most versatile of these various catalytic agents is molybdenum oxide. This material per se is, however, a relatively poor catalyst except for certain specific cases and, as such, finds relatively little application. All of the advantageous characteristics of molybdenum oxide are only brought out when this material is applied in combination with suitable less active materials which also usually act as supports, carriers or extenders, and in this form it finds relatively wide and varied application.

One of the primary functions of supports or extenders in molybdenum oxide catalysts is to increase the available catalytic surface. In conversions executed with the aid of solid catalysts, the reactions take place predominantly at the fluid-solid interface. It is known that certain substances have, besides the usual exterior surface, a minute porous structure and have therefore a large inner surface. Substances having large inner surfaces are generally active, i. e. adsorptive, and it can be shown that the adsorption ability of such solids is generally more or less proportional to the inner surface. When molybdenum oxide is deposited upon such materials, a large catalytic surface is provided and catalysts of superior activity are produced. As will be seen, however, in properly designed catalysts the substance with which the molybdenum oxide is combined, besides affording an increased catalytic surface, has other important functions.

A great number of substances having large available surfaces have been used or suggested as supports for molybdenum oxide. Of the numerous materials available, alumina, due to its marked superiority in certain respects, is a particularly excellent carrier. The superiority of alumina over other carrier materials is due largely to its superior stabilizing and promoting properties in combination with a large inner surface, moderately good thermal stability, and availability. Alumina, it is found, is especially effective in stabilizing the activity of catalytic promoters deposited thereon. According to A. Mittasch and E. Keunecke [Z. Elektrochem 38, 666 (1932)], the stabilizing effect of alumina is due primarily to the fact that the somewhat porous interlayers of alumina prevent the recrystallization or sintering of the active catalyst. It has recently been found that alumina carriers frequently act as true catalyst promoters for many catalytic agents, such in particular as the oxides of chromium and molybdenum. An excellent example of such promoter is, for instance, the promotion of chromium oxide by alumina. Chromium oxide deposited on active alumina is over twice as active as the same chromium oxide deposited upon silica gel, notwithstanding the fact that the inner surface of the silica gel is much larger than that of the active alumina.

Although alumina is recognized as the best carrier or extending material for molybdenum oxide, it is well known that all aluminas are not equivalent and that some are not suitable. The aluminas employed in such catalysts are invariably activated, i. e. adsorptive, aluminas. Aluminas ordinarily contain considerable amounts of combined water. By suitably heating the alumina to drive out a portion of the water, small pores are opened up in the interior, and it becomes adsorptive. It is then said to be activated. Alpha alumina, for example, which is the corundum form, contains little or no inner surface, cannot be activated, and is entirely unsuitable. Also, the alumina beta monohydrate, which has never been synthetically prepared but occurs in nature as the mineral diaspore, is likewise very inferior. The alumina beta monohydrate, diaspore, has little adsorptive capacity and, if heated to drive off part of its water, it is converted directly to inactive alpha alumina. Suitable activated aluminas, on the other hand, may be prepared from the gamma aluminas of the Haber system. Haber [Naturwiss 13, 1007 (1925)] classifies the various forms of alumina into two systems designated by him as the gamma and beta systems, according to their behavior upon heating. The gamma aluminas of the Haber classification comprise gamma alumina and the so-called hydrated aluminas which, upon heating, are converted to alpha alumina through the gamma form. The beta aluminas of the Haber system of classification comprise those aluminas such as diaspore which, upon heating, are converted directly to alpha alumina without going through the gamma form. The classification of aluminas into two systems, designated gamma and beta, according to Haber is not to be confused with the fundamental true alumina forms. This classification is merely for the purpose of dividing the common forms of alumina into two distinct groups. Thus, the various so-called hydrated aluminas which are classified as belonging to the gamma system in the Haber classification are totally distinct from the true gamma alumina, and diaspore is not a beta alumina. The aluminas which, upon heating, are converted into alpha alumina through gamma alumina and belong to the gamma system of the Haber classification are:

The alumina alpha trihydrate, known as gibbsite or hydrargillite. This form is readily prepared synthetically and occurs in nature in the mineral gibbsite and as a component of certain bauxites;

The alumina beta trihydrate, known also as bayerite. It is isomorphous with hydrargillite. It does not occur naturally, but may be prepared synthetically by proper control of the precipitation conditions;

The alumina alpha monohydrate, known as böhmite. This alumina is formed by the partial dehydration of either of the above two trihydrates;

Gamma alumina. This is a meta-stable anhydrous oxide which does not occur naturally, but may be prepared by carefully controlled dehydration of any of the first three mentioned hydrates;

Gelatinous aluminum hydroxide. This frequently encountered alumina is amorphous when freshly precipitated, but after aging the characteristic lines of böhmite can be detected by X-ray analysis. On further aging, the precipitate is gradually transformed to bayerite and finally to hydrargillite;

Bauxite. This ore is of varied composition. The term "bauxite" was used in the older literature to designate the dihydrate. It is now known that bauxite consists of an extremely finely divided mixture of two or more of the known aluminas and certain argillaceous residues. No dihydrate of alumina has ever been observed.

While the mentioned gamma aluminas of the Haber system yield adsorptive aluminas from which highly active moylbdena-alumina catalysts may be prepared, some of these are much superior to others. The best catalysts are usually prepared from adsorptive aluminas prepared by dehydrating (activating) alumina trihydrate which has been crystallized from alkaline aluminate solutions. The catalysts prepared with adsorptive aluminas obtained by dehydration of alumina trihydrate crystallized from alkaline aluminate solutions are highly active, stable to mechanical degradation, and are quite stable catalytically. They may be used for long periods of time before losing their activity. These excellent properties of the catalysts so prepared are definitely traceable to the particular type of alumina used.

It has been suspected that these superior properties are due to at least two fundamental characteristics of this type of alumina. The first of these is the much higher mechanical strength of the aluminas produced in the described manner. This matter of strength of the catalyst is very important since during use the strength tends to decline and unless a catalyst of very high initial mechanical strength is employed it is apt to crumble when used in large beds. Failure of the catalyst strength produces fines, causes plugging, channeling, etc., and is very undesirable. The second characteristic is that the aluminas produced as described invariably contain appreciable amounts of impurities such as, in particular, sodium salts. The sodium is intimately associated with the alumina due to its method of preparation. The alumina therefore contains at least 0.3% and usually in the order of 1% of sodium. This sodium in the preferred type of aluminas has been considered to be partly responsible for its superiority as a constituent of the catalysts of the type in question. It is well known that small amounts of the alkali metals are highly beneficial in many related catalysts. Thus, for example, small amounts of sodium are known to promote the water gas reaction with similar metal oxide catalysts such as the oxides of iron, cobalt, nickel, chromium, etc. The presence of the sodium, therefore, no doubt is beneficial in the regeneration of the catalyst and also probably allows a certain amount of carbon removal from the catalyst during use by reaction with traces of water. Thus, for example, Grosse et al. (U. S. Patent 2,172,534) have shown that small percentages of sodium in chrome-alumina and moylbdena-alumina catalysts decrease the carbon deposition and recommend alkalizing the alumina carrier with about 1% of sodium oxide prior to incorporating the molybedenum oxide. It is also well known that small amounts of alkali metals greatly promote the dehydrogenation and dehydrocyclization activity of the closely related iron-alumina and chrome-alumina catalysts. This is shown in U. S. Patents 2,129,142, 2,249,337 and 2,271,751.

Aside from the above-mentioned promoting effects, there is ample reason to expect the presence of the sodium or other alkali metal in the preferred alumina of this particular type to be very beneficial in still a different respect.

From the above it is seen that the superior stability of the preferred particular type of alumina with respect to mechanical strength and its superiority with respect to its higher catalytic activity are both logically traced to its content of impurities, chiefly sodium, which are largely intimately bound up in the alumina during its crystallization. The superiority of the preferred type of alumina with respect to retention of its high activity is also logically traced to this bound sodium. Thus, adsorptive aluminas, when subjected to relatively elevated temperatures, gradually revert into the stable alpha modification which, as explained above, is entirely unsuitable for use in catalysis. This transformation takes place at appreciable rates only at temperatures of the order of 900° C.–1000° C. or above. At lower temperatures such as are usually employed in catalytic processes this conversion is quite slow, but nevertheless takes place over extended periods of time. It is also found that in the presence of molybdenum oxide the undesirable conversion takes place at appreciable rates at much lower temperatures. The first step of the accelerated transformation appears to be the formation of a definite molybdena-alumina compound which then breaks down easily into molybdenum oxide and alpha alumina. X-ray studies have shown that the deactivation of the molybdena-alumina catalysts in use is largely due to this transformation. It has also been shown by X-ray studies that the preferred particular type of alumina is much more difficult to convert to the alpha modification by heating than are other aluminas. If an adsorptive alumina containing sodium is heated at relatively high temperatures, it is found that the sodium enters the crystal lattice of the gamma alumina to form a stable beta alumina which is not converted to alpha alumina even at very high temperatures. A method for producing heat-stable catalysts making use of this fact is described and claimed in copending application Serial No. 434,630, filed March 14, 1942, now abandoned.

It is to be particularly emphasized that the effect of sodium on the thermal stability of gamma alumina is distinctly and entirely different from its effect upon the thermal stability of silica gels or hydrous aluminum silicates. In preparing siliceous catalysts (particularly the highly developed silica base catalysts for catalytic cracking), it is known that even very small traces of alkali metal salts are very detrimental. In this case, however, the sodium salts act as a flux and cause a great decrease of the active inner surface due to simple sintering.

Of the adsorptive aluminas prepared by dehydration of aluminas precipitated from alkali aluminate solutions, the massive variety (as distinguished from the powders) obtained by certain crystallization methods is by far the best for use in preparing molybdena-alumina catalysts and is the variety presently used commercially. This variety of alumina is readily obtained in massive (i. e. not pelleted) fragments of suitable size for use in catalysis. Suitable sizes are, for example, 4 to 8 mesh and 2 to 4 mesh.

In order that the importance of the variations in the method of catalyst preparation may be readily appreciated, it is desirable to indicate the method of preparation hitherto employed and the reasons for the adaption in practice of this particular method. In the art, and particularly the patent art, a variety of methods have been indicated as possible (and substantially equivalent as far as the properties of the catalyst are concerned) for the preparation of the general class of metal oxide dehydrogenation catalysts. Thus, there are described various methods of impregnating a wide variety of carrier materials as well as various co-precipitation methods. Although it might be assumed from the teachings of such art that these various methods would be applicable and would afford equivalent catalysts, several practical considerations have hitherto excluded all but one method. In the method presently practiced the adsorptive alumina carrier is impregnated with a solution of a suitable molybdenum compound such as, for example, ammonium molybdate. Adsorptive aluminas vary somewhat from batch to batch in adsorptive ability, depending upon the degree of activation and certain other factors. In order therefore to secure batches of catalyst having a uniform molybdena content, it is the practice to impregnate the alumina with such a quantity of ammonium molybdate solution that the entire solution is adsorbed in the alumina. Since all of the molybdenum applied is taken up by the alumina particles, the concentration of molybdena in the catalyst may be easily controlled by adjusting the amount of molybdenum applied, and no variation in the catalyst composition is caused by any irregularities in the degrees of activation of the alumina. This method is also considered advantageous in several other practical respects. Thus, by this method the molybdena is largely concentrated near the macro surface of the alumina particles. The catalyst is used in the form of pieces of suitable size, for example, 2-4 mesh pieces. The reaction therefore takes place largely near the surface, and the carbonaceous deposits are largely concentrated near the macro surface. The regeneration is therefore more easily effected in a shorter time since carbonaceous matter which is deposited near the center of the catalyst particles is difficult to remove and requires a long burning with higher-than-usual concentrations of oxygen. Another advantage of the described method is that it avoids contamination of the catalyst and waste of molybdenum. Thus, the aluminas employed usually contain traces to appreciable concentrations of certain impurities. If an excess of a more dilute aluminum molybdate solution were employed, these impurities would accumulate in the ammonium molybdate solution. The excess ammonium molybdate solution would therefore have to be discarded or used in a contaminated condition for the next batch of catalyst.

In view of the ability of the described molybdenum oxide-alumina catalysts to catalyze at least to a certain extent such reactions as the dehydrogenation of organic compounds, the dehydrocyclization of paraffin hydrocarbons to aromatic hydrocarbons, the dehydroisomerization of such compounds as methyl cyclopentane, dimethyl cyclopentane, ethyl cyclopentane, etc. directly to aromatic hydrocarbons, the hydrogenation of various unsaturated organic compounds, the isomerization of isomerizable paraffin hydrocarbons, the desulfurization of sulfur-bearing hydrocarbon fractions, the destructive hydrogenation of high molecular weight carbonaceous materials, the oxidation of organic compounds, and the like, these versatile catalysts have been widely experimented with and for certain applications have come into wide use. One such application to which the present invention relates in particular is hydroforming.

Hydroforming, as the term is herein used, is defined as a process for the treatment of vaporizable normally liquid petroleum hydrocarbons and hydrocarbon fractions such, in particular, as petroleum fractions boiling within the gasoline boiling range in the vapor phase under conditions of elevated temperature and pressure in the presence of added hydrogen and a molybdena-alumina catalyst of the type described, thereby to effect certain desirable changes in the hydrocarbon treated. The conditions are so chosen that no substantial amount of destructive hydrogenation takes place. In the process of the hydroforming various types of reactions can, and usually do, take place to various extents, depending somewhat upon the particular feed and the particular conditions. One reaction which is usually important is the dehydrogenation of hydroaromatic hydrocarbons to their corresponding aromatic hydrocarbons. Another reaction which generally is quite important is dehydrocyclization. Another reaction which usually takes place when treating sulfur-containing feeds is hydrogenation of the sulfur compounds to hydrogen sulfide. Under some conditions, depending upon the hydrogen pressure and temperature, a certain amount of hydrogenation of olefins may take place. Although hydroforming is not usually conducted for the purpose of producing cracking, a small amount of cracking usually does take place. Although hydroforming may be applied advantageously to a large number of materials, its more important uses are for the improvement of the anti-knock characteristics of hydrocarbon distillates destined for use in motor fuel and to produce substantially pure aromatic hydrocarbons such as toluene from selected hydrocarbon fractions.

In the process of hydroforming the hydrocarbon or hydrocarbon fraction to be hydroformed is vaporized and the vapors are contacted in the presence of added hydrogen under hydroforming conditions with a suitable dehydrogenation catalyst. The temperatures applied depend somewhat upon the feed and upon the other factors involved but are usually between about 405° C. and 525° C. The process is generally carried out at superatmospheric pressures which are, however, in no case sufficiently high to cause substantial destructive hydrogenation. Suitable pressures vary, for instance, between about 2 and 40 atmospheres. The contact time depends upon the particular economies of the plant, upon the activity of the catalyst, upon the feed, etc. Thus, the liquid hourly space velocity may vary from between about 0.3 to 2. In order to supply a suitable partial pressure of hydrogen, hydrogen is added in a ratio of from about 1:1 mols of hydrogen per mol of hydrocarbon feed to about 30:1 mols of hydrogen per mol of hydrocarbon feed. In the process hydrogen is generally produced. During use the activity of the catalyst declines relatively rapidly due to the deposition thereon of carbonaceous matter. It is therefore the practice to stop the hydroforming at frequent intervals, flush the catalyst of hydrogen and hydrocarbon vapors, and burn off the carbonaceous deposits at atmospheric or superatmospheric pressure with a carefully controlled stream of gas containing a controlled concentration of oxygen or other oxidizing medium. Also, during use the catalyst gradually undergoes a permanent deactivation which cannot be counteracted by any known regeneration treatment. When the catalyst declines to a given level, it is necessary to discard it and substitute fresh catalyst.

In the catalysts of the type in question the activity is more or less proportional to the concentration of the molybdenum oxide up to a certain point. Thus, for example, in hydroforming the activity of the catalyst increases with increase in molybdenum content up to about a point where the concentration of molybdenum oxide corresponds to about $4 \times 10^{-4}$ grams per square meter of surface of the alumina. In the preferred alumina of the type described above where the available surface is usually in the order of about 150 square meters per gram (as measured by nitrogen adsorption), this corresponds to about 6% by weight of molybdenum. While lower concentrations give lower activities, higher concentrations give about the same activity. Consequently, in hydroforming practice the catalysts are adjusted to contain 6% molybdenum.

In the above the best molybdena-alumina catalysts of the art have been described in detail and the reasons for the various steps and choices have been pointed out. We have now made the unexpected finding that certain of the steps now employed are detrimental rather than advantageous and that these catalysts may be still further greatly improved by certain changes in the catalyst preparation. Thus, by certain changes in the methods of preparation and by certain combinations of steps, it is possible to produce catalysts of the described type which are not only more active but are more stable against loss of activity with heat and use and are furthermore more stable against loss of mechanical strength with heat and use. These advantages are of the utmost importance, particularly in hydroforming.

The improved catalysts of tht present invention evolved from certain combinations of findings which will be explained. Our findings substantiate our previous findings and also those of the art that the preferred alumina is the above-described massive adsorptive alumina, preferably in gamma form, prepared by the dehydration of alumina crystallized from alkaline aluminate solutions. Our findings are also in complete agreement with the following facts, explained above:

(1) That adsorptive aluminas upon being subjected to the elevated temperatures encountered in various vapor phase processes, particularly during the periodic regeneration treatments, are slowly converted into the inactive alpha modifications.

(2) That in the presence of molybdenum oxide this transformation (1) takes place readily at temperatures encountered in use, resulting in deactivation of the catalysts.

(3) That the transformation of alumina into the inactive alpha alumina in the presence of molybdenum oxide takes place in two steps, to wit: the formation of a compound of the molybdena and alumina, and the resolution of this compound into molybdena and alpha alumina.

(4) That adsorptive aluminas of the preferred type which are prepared from aluminas precipitated from alkaline aluminate solutions and thus contain appreciable quantities (0.5% to 1.25%) of alkali metal (sodium) salts intimately associated with the alumina are much more difficult to convert to the alpha modification by heating.

We have found, however, (1) that in the presence of molybdena the conversion of the alumina to alpha alumina is catalyzed by traces of alkali metal salts, and (2) that of the content of alkali metal salts invariably present in the preferred aluminas is reduced to a certain critical maximum this undesirable deactivation mechanism is substantially prevented. Thus, contrary to expectation, by employing aluminas of the preferred type, from which the alkali metal salts have been removed down to below a certain critical maximum, catalysts may be prepared which maintain their activity in use for much longer periods of time. We have, furthermore, found that catalysts prepared with aluminas from which the alkali metal salts, which are invariably present, have been removed down to this certain critical maximum are also much superior to the hitherto-employed catalysts in that they afford much greater production capacities per volume of catalyst. It is to be pointed out that the above important findings appear to hold only in specific cases of molybdena-alumina catalysts. The critical maximum amount of alkali metal mentioned above is about $1.11 \times 10^{-5}$ grams per square meter of surface of the alumina as measured by nitrogen. Thus, in the preferred aluminas of the type now used in which the area is approximately 150 m.$^2$/g., the critical maximum content of sodium is about 0.17%. As explained above, the sodium or other alkali metal in the alumina is intimately bound due to the crystallization of the base alumina from alkali aluminate solutions. While we do not intend to be bound by the correctness of the statement, all available evidence indicates that the alkali metal present after the alkali metal content has been reduced to below the above-given critical maximum is alkali metal which is intimately bound in the inaccessible interior of the alumina and that the active surface of the alumina contacted by the molybdena is actually free of all but the most minute traces of alkali metal. This is in keeping with the criticality of the maximum allowable content of alkali metal.

These unexpected and important findings and the superiority of catalysts prepared with the preferred type of alumina, from which the content of alkali metal (sodium) invariably present has been removed down to below the given critical maximum, are shown by the following examples.

EXAMPLE I

A molybdena-alumina catalyst was prepared starting with a 2-4 mesh massive adsorptive alumina obtained by the partial dehydration of an alumina trihydrate which was crystallized from a sodium aluminate solution. This alumina contained about 6% $H_2O$ and about 0.33% Na and had an active surface of approximately 180 $m.^2/g.$ The alumina was washed with a 0.1 molar solution of aluminum nitrate at room temperature until the concentration of sodium was reduced to 0.07%. It was then washed with water and dried, and finally heated at 700° C. for 6 hours to convert it largely into the gamma form. It was then impregnated with an excess of a solution of ammonium molybdate (12.9% molybdenum) at room temperature for 5 hours. The excess solution was drained and the impregnated alumina dried at 120° C. and heated at 500° C. for 2 hours to convert the ammonium molybdate to molybdenum oxide. The catalyst contained 6.09% molybdenum. This catalyst was tested for the hydroforming of a commercial straight run petroleum fraction containing a considerable concentration of methyl cyclohexane under the following practical hydroforming conditions:

Temperature_____ 490° C.
Pressure_____ 20 atms.
Liquid hourly space velocity____ 0.65, 1.5, and 2.5
Mols diluent gas/mol of hydro-
  carbon feed_____ 5:1 (50% $H_2$)

The activity of the catalyst as indicated by the per cent by volume of aromatic hydrocarbons in the liquid product and the yield of aromatic hydrocarbons expressed in per cent by volume of the feed are given in the following Tables I and II. For comparison the results obtained with the same feed under the same conditions with a standard hydroforming catalyst prepared with the same type of base alumina are given.

Table I

| | Per cent of aromatic hydrocarbons in the liquid product by volume | | |
|---|---|---|---|
| Liquid hourly space velocity | 0.65 | 1.5 | 2.5 |
| Standard catalyst | 55.4 | 43.9 | 35.5 |
| Improved catalyst | 69.3 | 54.7 | 43.4 |

Table II

| | Yield of aromatic hydrocarbons, per cent by volume of the feed | | |
|---|---|---|---|
| Liquid hourly space velocity | 0.65 | 1.5 | 2.5 |
| Standard catalyst | 46.4 | 39.6 | 32.9 |
| Improved catalyst | 50.5 | 46.6 | 38.7 |

The data of Table II is shown graphically in Figure 1 of the attached drawing wherein curve A is for the improved catalyst and curve C is for the standard catalyst. It will be observed that the activity and efficiency of the improved catalyst of the invention is considerably above that of the standard catalyst which, it is to be understood, is not just another catalyst but is representative of the best catalyst of the type hitherto known in the art. This improvement is furthermore considerably greater than it might appear from consideration of the increase conversions obtained. Thus, by inspection of Figure 1 of the drawing it is seen that the improved catalyst may be employed at a space velocity of about 1.56 to give substantially equivalent conversions as the standard catalyst at the commercial space velocity of 0.65. Thus, it is seen that by the application of the improved catalyst of the invention the productive capacity per catalytic converter may be increased about 240%.

EXAMPLE II

During use all molybdena-alumina catalysts gradually undergo a certain deactivation and usually a loss in mechanical strength. This it has been found is due primarily to the relatively high temperatures to which the catalyst is subjected, particularly in the regeneration treatment. The ability of the catalysts to maintain their activity and strength is therefore determined by their heat stability. A heat treatment at a temperature of 800° C. for a period of 6 hours corresponds approximately to a period of about 3-4 months of use under average normal conditions in the plant. The above-described standard catalyst and the improved catalyst described in Example I were subjected to this heat treatment and then tested with respect to hydroforming activity under the conditions described in Example I. The activities expressed as yields of aromatics in per cents by volume of the feed are given in the following Table III.

Table III

| | Yield | | |
|---|---|---|---|
| Liquid hourly space velocity | 0.65 | 1.5 | 2.5 |
| Standard catalyst | 25.4 | 18.8 | 17.1 |
| Improved catalyst | 47.8 | 40.0 | 32.6 |

Comparing Table III with Table II it is seen that whereas the standard catalyst lost substantially all of its activity, (the initial feed contained about 15% by volume of aromatics) the improved catalyst lost comparatively little activity. Thus the improved catalyst after this heat treatment, which, as explained, is equivalent to 3-4 months of use, was still more active than the fresh standard catalyst. These results are also shown in Figure 1 of the attached drawing, wherein curve B is for the improved catalyst and curve D is for the standard catalyst.

EXAMPLE III

A molybdena-alumina catalyst was prepared starting with a pilled gamma alumina which was prepared by dehydrating an alumina precipitated from a sodium aluminate solution. The alumina, having a surface of about 90 $m.^2/g.$ and containing about 0.5% sodium, was treated with a 0.1 molar solution of aluminum nitrate until the concentration of sodium was reduced to about 0.30%. It was then washed with water and dried, and impregnated by the accepted method, i. e. by completely adsorbing an ammonium molybdate solution. After drying and heating at 500° C. for two hours, the catalyst contained about 8.1% molybdenum.

A second catalyst was prepared in the same manner except that the treatment with aluminum nitrate was continued to reduce the concentration of sodium to about 0.18%. The finished catalyst contained about 8.6% molybdenum.

A third catalyst was prepared from a similar alumina base in powder form. The alumina powder was treated with 0.1 molar aluminum nitrate to reduce the concentration of sodium down to 0.10%. After water washing and drying the alumina was formed into ⅛-inch cylindrical pellets which were then impregnated with about 8.2% molybdenum in the described manner.

These catalysts were tested for the dehydrogenation of methyl cyclohexane under the following conditions:

Temperature _____ 490° C.
Pressure _____ 20 atm.
Liquid hourly space velocity _____ 0.24
Diluent gas/mol of feed _____ 5:1 (50% $H_2$)

Portions of the catalysts were also subjected to a heat treatment at 800° C. for six hours and then tested under the above conditions.

The fresh catalysts in each case gave conversions in the order of 94%. The conversions obtained with the "used" catalysts are given in the following table:

*Table IV*

| Catalyst | Concentration of Sodium | Conversion |
|---|---|---|
| 1 | 0.30 | 76.4 |
| 2 | 0.18 | 79.2 |
| 3 | 0.10 | 92.8 |

Referring to the data of Table IV, it is seen that removing the sodium down to a content of 0.30% or 0.18% is insufficient to materially increase the stability of the catalyst whereas exhaustive removal down to a concentration of 0.10% results in a catalyst which is exceptionally stable. Since the available surface of the alumina was in the order of 90 square meters per gram, the sodium content of the stable catalyst corresponded to about the limiting maximum concentration of $1.11 \times 10^{-5}$ grams per square meter of surface.

The removal of the sodium and/or other alkali metal salts invariably present in the aluminas derived from alkaline aluminate solutions may be effected by exhaustive washing, preferably with an acid such, for instance, as a dilute solution of hydrochloric acid, nitric acid, acetic acid, or the like, having a pH preferably of 4 or below. Sulfuric acid is less suitable since sulfates left in the alumina are harmful. Hydrofluoric acid and similarly acting fluorides are also less suitable since aluminas treated with these agents are found to contain appreciable concentration of fluorides, probably aluminum fluoride, and are found to have considerably altered catalytic properties such, in particular, as an increased tendency to promote cracking.

The washing treatment may be effected with water but such treatment requires such an amount of time and such quantities of distilled water that it is impractical. Water saturated with carbon dioxide may be also used but is likewise relatively inefficient. A particularly effective way to remove the alkali metal salts is to wash the alumina with a dilute solution of a polyvalent metal salt in which case the sodium and/or other alkali metal is removed by replacement. Particularly suitable polyvalent metal salts are, for example, aluminum nitrate and aluminum chloride; other suitable salts of polyvalent metals which do not introduce undesired cations or anions into the catalyst may also be employed. Thus, for example, the alumina may be treated with a dilute solution of aluminum nitrate or aluminum chloride. This treatment generally requires several hours to remove the alkali metal to the desired low maximum concentration but may be hastened somewhat by heat and agitation. After the treatment to remove the alkali metal salts, either with acid solutions or by salt solutions, it is desirable but not essential to give the alumina a final washing treatment with water.

In order to bring the concentration of the alkali metal down to the critical maximum it is advantageous that the above-described treatments be effected while the alumina is in an active state. When the catalyst is to be prepared with the alumina in a state of hydration corresponding approximately to the alpha monohydrate (from about 6% to about 14% $H_2O$ by loss on ignition) the alumina is advantageously first dehydrated to the desired state and then subjected to one or more suitable treatments to remove the alkali metal salts from the large accessible inner surface until the alkali metal content is down to an preferably below the given critical limit. When the catalyst is to be prepared with the alumina largely in the gamma form (having less than about 5% $H_2O$ as determined by loss on ignition) the alumina may also be dehydrated to the desired extent and then subjected to one or more suitable treatments to remove the alkali metal to the indicated extent. In this case this method may be of particular advantage when the alumina is dehydrated substantially to completion ($H_2O$ content of 1% or less) and/or drastic conditions of dehydration are employed. It is, however, generally advantageous when employing gamma alumina to first partially dehydrate the alumina, for instance, down to a water content of about 5%–14%, treat it to remove alkali metal salts, and then further dehydrate it to the desired final state of dehydration. The reason for this is that the partially dehydrated alumina has a larger accessible inner surface (usually in the order of 150–200 square meters per gram) and consequently the content of the alkali metal salts may be more easily and effectively reduced. If the removal of the alkali metal salts in such treatment is sufficiently complete, it is not necessary to treat the alumina again after completing the dehydration. A treatment of the alumina after completing the dehydration is, however, sometimes advantageous since it sometimes happens that traces of the inaccessible alkali metal salts remaining after the first treatment are rendered accessible in the final dehydration step.

As indicated above, very important properties of molybdena-alumina catalysts which are generally given insufficient consideration are the mechanical strength and the ability to retain the mechanical strength upon use. The preferred catalysts of the prior art described in detail above have excellent and sufficient initial mechanical strength. During use, however, they lose their mechanical strenth and tend to become friable. This leads to crumbling, plugging and channeling. It is not intended to convey the impression that the better prior art catalysts prepared with the above-described preferred type of alumina are insufficiently stable mechanically to be practicable. Their lack of really good stability with regard to mechanical strength may be, however, a controlling factor, particularly with regard to the size and shape of the catalyst beds in which they may be practically applied. We have found that the ability of molybdena-alumina catalysts to retain their mechanical stability even after being heated at temperatures higher than usually encountered for any extensive periods in use may be greatly improved by varying the methods of preparation. As explained above, the accepted method of impregnating the alumina with the molybdenum oxide is to impregnate it with such an amount of a solution of a suitable molybdenum compound in such concentration that the entire amount of solution is taken up (absorbed) by the alumina and supplies the exact total amount of the molybdenum salt applied. The reasons for the use of this method have been pointed out. It is now quite unexpectedly found that catalysts having materially greater stability with respect to mechanical strength (hereinafter referred to as mechanical stability as distinguished from catalytic stability) result if the impregnation is effected by soaking the alumina in an excess of a solution of the molybdenum salt of such a concentration that the desired amount of molybdenum is impregnated.

The alumina is impregnated with a solution of a suitable molybdenum compound convertible to the oxide by heating. A particularly suitable compound is, for example, ammonium molybdate. The solution of the molybdenum compound is employed in a quantity sufficient to completely cover the alumina when the latter is saturated and the amount of molybdenum adsorbed is controlled by adjusting the concentration of molybdenum in the solution. This may require carefully controlling the adsorptive capacity of the alumina and/or individual tests for each batch of alumina. As will be seen, however, the advantage gained far outweighs this inconvenience. The excess solution of the molybdenum compound is then drained and the alumina dried and calcined in the usual manner to convert the molybdenum compound to molybdenum oxide. The excess solution of the molybdenum compound may be reused after adding a further amount of water and a sufficient amount of the molybdenum compound to bring the molybdenum concentration to the desired level. Due to traces of impurities in the water, in the molybdenum compound, etc., it may be necessary to discard the drained excess solution of the molybdenum compound after the preparation of a number of batches of catalyst. It will be seen, however, that this disadvantage is far outweighed by the superiority of the product obtained. It is not known why this method of impregnation gives such an unexpected difference but it is believed that it is due to the fact that in this method of impregnation the molybdenum is much more evenly distributed in the alumina particles. Although the preferred alumina is the above-described massive variety, suitable catalysts may also be prepared from non-massive (i. e. pelleted powders) adsorptive aluminas which are derived from alumina precipitated from alkali solutions and, when using such aluminas, catalysts having considerably increased mechanical stability are produced when the alumina is impregnated with the molybdenum salt prior to pelleting. Pellets of suitable mechanical stability may, however, be prepared if the pellets are impregnated by the above-described preferred method.

The catalysts prepared from aluminas of the alkali-containing type from which the alkali metal has been removed down to the given critical limits, even when impregnated by the conventional method have mechanical stabilities as good as those now commercially used. Their mechanical stability is, however, improved by the described method of impregnation. It is also found that the mechanical stability of the catalysts impregnated by the conventional method may be greatly improved by another entirely unexpected small change in the method of preparation. As explained above, the initial activity of molybdena-alumina catalysts increases rapidly with increasing concentrations of molybdena up to a concentration of about $4\times10^{-4}$ grams per square meter of available surface from which point on, it increases only very little with increasing concentrations. Consequently, in order to obtain the highest activity without waste of valuable molybdenum, the commercial catalysts are prepared with $4\times10^{-4}$ grams molybdenum per square meter of surface. It is now found that in the case of the above-described catalysts which are substantially free of alkali metals a great increase in the mechanical stability is obtained if the amount of molybdenum oxide applied is carefully regulated not to exceed $3.5\times10^{-4}$ grams molybdenum per square meter of surface and preferably between about $2.7\times10^{-4}$ and $3.2\times10^{-4}$ grams molybdenum per square meter of surface. With the preferred aluminas having a surface area of about 150 square meters per gram, this corresponds to a maximum concentration of molybdenum of 5.25% and a preferred range between about 4.05% and 4.80% by weight. The use of these lower-than-usual concentrations of molybdenum in the catalysts results in a slightly decreased initial activity. This slight decrease in the initial activity is apt to be misleading, however, since it is found that after a period of use the difference in activity with change in molybdenum concentration in this range is very small. Moreover, as was pointed out above, the alkali metal-free catalysts containing the conventional concentrations of molybdenum are more active than the conventional catalysts containing the usual concentrations of sodium. The result therefore of removing the alkali metals to the indicated critical limits and limiting the concentrations of molybdenum to the indicated concentrations is to afford a catalyst having substantially the same initial activity as the best of the conventional catalysts but much superior to the conventional catalyst in having a much better stability of catalytic activity and also a much better mechanical stability. These catalysts may therefore be applied for much longer periods of time before it is necessary to replace them.

The great improvement in the mechanical stability of the catalysts prepared with substantially alkali metal-free alumina and containing limited concentrations of molybdenum is shown in the following comparable examples:

EXAMPLE IV

A series of catalysts was prepared starting with granules of massive adsorptive alumina obtained by the partial dehydration of an alumina trihydrate which was crystallized from a sodium aluminate solution. The alumina in the active, partially dehydrated state was treated as described to reduce the concentration of sodium to about 0.07% by weight. The substantially sodium-free alumina was then further dehydrated to convert it largely into the gamma form and impregnated in the described preferred manner with solutions of ammonium molybdate to produce a series of similar catalysts having different concentrations of molybdenum. These catalysts were then applied in a hydro-forming treatment under the same conditions (LHSV=0.65) and with the same hydrocarbon feed as shown in Example I. Portions of the catalysts were also heated at 800° C. for six hours as described above to rapidly bring them to a state of decline comparable with 3–4 months of continuous use under these conditions, and these portions were then also applied in the hydroforming treatment. The activities found, expressed in terms of the aromatic yield based on the feed, are given in the following Table V.

Table V

| Catalyst | Per Cent Molybdenum | Yield of Aromatics Based on the Feed | |
|---|---|---|---|
| | | Fresh Catalyst | "Used" Catalyst |
| 1 | 2.78 | 39.4 | 43.8 |
| 2 | 4.51 | 48.7 | 48.9 |
| 3 | 5.04 | 48.5 | 46.6 |
| 4 | 5.91 | 51.1 | 46.4 |
| 5 | 6.09 | 50.4 | 47.8 |
| 6 | 8.66 | 52.7 | 47.7 |

Figure 2:
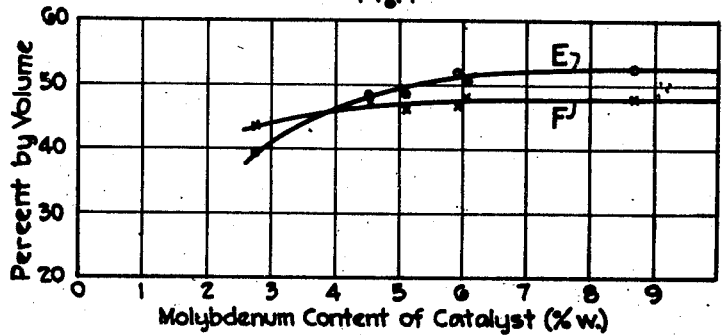

This data is plotted in Figure 2 of the attached drawing wherein curve E is for the fresh catalyst and curve F is for the "used" catalyst. Referring to the above table and to Figure 2, it will be seen, as pointed out above, that above concentrations of about 6% molybdenum the activity of the catalysts increases only slightly with increasing concentrations of molybdenum. It will also be seen that after a long period of use the concentration of molybdenum vs. activity curve is flatter. This example furthermore confirms the exceptional activity stability of the present catalysts, and when compared with Example V below shows the fundamental difference in the effect of the molybdenum concentration upon the activity stability and the equally important mechanical stability. Catalyst containing 6% molybdenum is seen to be much more active than catalyst containing between 4 and 5% molybdenum. As pointed out above, small differences in activity as measured in per cent yield of aromatics are equivalent to large differences in the applicable space velocity at equal conversions. It is furthermore seen that the activity curves corresponding to the fresh and "used" catalysts cross in the critical region of molybdenum concentrations between about 4 and 5%. Thus, although catalysts containing 6% molybdenum are considerably more active initially than catalysts containing about 4.2% molybdenum, the catalyst containing only about 4.2% molybdenum is equally active after a period of use. Since the active surface of the alumina prior to the impregnation with the ammonium molybdate was in the order of 150 m.$^2$/g., the catalyst containing 4.5% molybdenum had a molybdenum concentration of about $3 \times 10^{-4}$ grams molybdenum per square meter of surface.

EXAMPLE V

A series of catalysts was prepared as described in Example IV with the same alumina. In order to measure the mechanical strength of the catalysts weighed portions were placed in 250 cc. wide-mouth bottles and mechanically shaken on their longitudinal axis 300 times per minute. The shaking was continued for 5 minutes. The amount of degradation of the particles was then measured by screen analysis. Portions of the original catalysts were heated at 800° C. for six hours in air to simulate 3–4 months of use and then subjected to the same test of mechanical stability. The mechanical stabilities of the catalysts before and after the heat treatment, expressed in weight percentages of the particles retained by a six-mesh screen after the shaking, are shown in the following table:

Table VI

| Catalyst | Per Cent Molybdenum | Greater than 6-mesh | |
|---|---|---|---|
| | | Fresh Catalyst | "Used" Catalyst |
| 1 | 0 | 70 | 70 |
| 2 | 3 | 60 | 60 |
| 3 | 4.8 | 59 | 58 |
| 4 | 6 | 63 | 48 |

Figure 3:
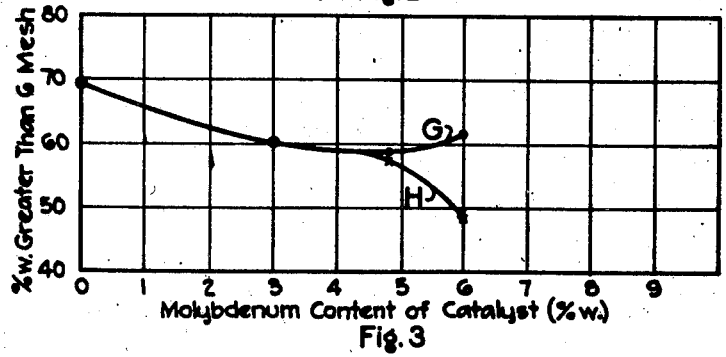

This data is plotted in Figure 3 of the attached drawing wherein curve G is for the fresh catalyst and curve H is for the "used" catalyst.

Referring to the above data and to Figure 3, it is seen that the mechanical stabilities of the catalysts even after the drastic treatment are substantially equal to the fresh catalysts up to a molybdenum content of about 4–5% molybdenum. It is seen that at higher concentrations of molybdenum the mechanical stability of the catalyst rapidly drops. The excellent mechanical stability of the catalyst containing about 4.8% molybdenum, the relatively poor mechanical stability of the catalyst containing 6% molybdenum, and the poor mechanical stability of a standard type catalyst containing 5.5% molybdenum which was treated and tested in the same manner, are shown in the following table. The figures given refer to the increase in degradation (i. e. increase in the per cent of the material degraded to less than 6 mesh) shown in the test after the applied heat treatment.

Table VII

| Catalyst | Per Cent By Weight Molybdenum | Increase in Per Cent Degradation Caused by Heating the Catalyst at 800° C. for 6 Hours |
|---|---|---|
| 1 | 0 | 1 |
| 3 | 4.8 | 1 |
| 4 | 6.0 | 14 |
| Standard Catalyst | 5.5 | 25 |

Referring to Table VII, it is seen that catalysts having a molybdenum content in the critical range of between about 4% and 5% by weight are much more mechanically stable than those containing the conventional 6% by weight molybdenum and are very much more stable than the type of catalyst now commercially used.

In the above we have described in detail how molybdena-alumina catalysts, prepared with various alkali-containing aluminas, may be increased in activity and greatly increased in catalytic stability by suitably removing the alkali metal salts to a certain critical maximum concentration, may be increased in mechanical stability by changing the method of impregnation, and how molybdena-alumina catalysts, prepared with various alkali-containing aluminas from which alkali metals have been removed to certain limits, may be greatly increased in mechanical stability by limiting the concentration of molybdena. The first improvement may be applied independently. The second improvement may be applied independently, or in conjunction with the first improvement, in which case the concentration of molybdenum may vary over a considerable range as shown in Example IV, and/or in conjunction with the first and third improvement to afford accumulated benefits.

We claim as our invention:

1. Process for the production of granular molybdena-alumina catalysts of the type described which comprises breaking massive alumina prepared from an alkali aluminate solution into granules between two mesh and eight mesh, activating the granules by partial dehydration to a water content between 5 per cent and 14 per cent by weight as determined by loss on ignition, removing alkali metal salts from the activated granules by leaching until the concentration of alkali metal is below $1.11 \times 10^{-5}$ grams per square meter of available surface, further dehydrating the substantially alkali-free alumina granules to a water content below 5 per cent, and impregnating the substantially alkali-free alumina granules with between $2.7 \times 10^{-4}$ and $3.5 \times 10^{-4}$ grams of molybdenum as molybdenum oxide per square meter of surface.

2. Process for the production of granular molybdena-alumina catalysts of the type described which comprises breaking massive alumina prepared from an alkali aluminate solution into granules between two mesh and eight mesh, activating the granules by partial dehydration to a water content between 5 per cent and 14 per cent by weight as determined by loss on ignition, removing alkali metal salts from the activated granules by leaching with a solution of aluminum nitrate until the concentration of alkali metal is below $1.11 \times 10^{-5}$ grams per square meter of available surface, further dehydrating the substantially alkali-free alumina granules to a water content below 5 per cent and impregnating the substantially alkali-free alumina granules with between $2.7 \times 10^{-4}$ and $3.5 \times 10^{-4}$ grams of molybdenum, as molybdenum oxide, per square meter of surface.

3. Process for the production of granular molybdena-alumina catalysts of the type described which comprises breaking massive alumina prepared from an alkali aluminate solution into granules between two mesh and eight mesh, activating the granules by partial dehydration to a water content between 5 per cent and 14 per cent by weight as determined by loss on ignition, removing alkali metal salts from the activated granules by leaching with a solution of hydrochloric acid until the concentration of alkali metal is below $1.11 \times 10^{-5}$ grams per square meter of available surface, further dehydrating the substantially alkali-free alumina granules to a water content below 5 per cent and impregnating the substantially alkali-free alumina granules with between $2.7 \times 10^{-4}$ and $3.5 \times 10^{-4}$ grams of molybdenum as molybdenum oxide, per square meter of surface.

MIROSLAV W. TAMELE.
VANAN C. IRVINE.
JAMES F. MAHAR.

REFERENCES CITED

The following references are of record in the file of this patent:

UNITED STATES PATENTS

| Number | Name | Date |
|---|---|---|
| 2,184,235 | Groll et al. | Dec. 19, 1939 |
| 2,209,908 | Weiss | July 30, 1940 |
| 2,229,353 | Thomas et al. | Jan. 21, 1941 |
| 2,231,446 | Grosse | Feb. 11, 1941 |
| 2,270,165 | Groll et al. | Jan. 13, 1942 |
| 2,273,338 | Thomas | Nov. 3, 1942 |
| 2,274,633 | Pitzer | Mar. 3, 1942 |
| 2,277,512 | De Simo et al. | Mar. 24, 1942 |
| 2,288,336 | Welty et al. | June 30, 1942 |
| 2,301,044 | Heard | Nov. 3, 1942 |
| 2,311,979 | Corson et al. | Feb. 23, 1943 |
| 2,340,935 | Connally | Feb. 8, 1944 |
| 2,345,600 | Heard | Apr. 4, 1944 |
| 2,369,734 | Heard | Feb. 20, 1945 |
| 2,406,420 | Weiser et al. | Aug. 27, 1946 |

OTHER REFERENCES

Activated Alumina, Pub. by Aluminum Ore. Co., East St. Louis, Ill. in 1938, pages 1 and 24.